(12) United States Patent
Bahlke et al.

(10) Patent No.: US 8,146,111 B2
(45) Date of Patent: Mar. 27, 2012

(54) CALLING SERVICES FROM A REMOTE CLIENT

(75) Inventors: Rolf Bahlke, Darmstadt (DE); Bernhard Fricke, Langen (DE)

(73) Assignee: Software AG, Darmstadt (DE)

( * ) Notice: Subject to any disclaimer, the term of this patent is extended or adjusted under 35 U.S.C. 154(b) by 1078 days.

(21) Appl. No.: 12/031,469

(22) Filed: Feb. 14, 2008

(65) Prior Publication Data

US 2009/0199220 A1    Aug. 6, 2009

(30) Foreign Application Priority Data

Feb. 6, 2008  (EP) .................................. 08002172

(51) Int. Cl.
*G06F 9/44* (2006.01)
*G06F 9/54* (2006.01)

(52) U.S. Cl. ........................ 719/330; 709/200

(58) Field of Classification Search .............. 719/330; 709/200
See application file for complete search history.

(56) References Cited

U.S. PATENT DOCUMENTS

| | | | |
|---|---|---|---|
| 6,219,835 B1 | 4/2001 | House | |
| 6,343,332 B1 * | 1/2002 | Ueda | 719/320 |
| 6,782,540 B1 * | 8/2004 | Chow et al. | 719/316 |
| 2002/0056012 A1 | 5/2002 | Abileah et al. | |
| 2005/0251809 A1 * | 11/2005 | Gunduc et al. | 719/310 |

OTHER PUBLICATIONS

European search report for application No. WO 08002172.8, mailed Aug. 1, 2008.
Chu, et al.; "On the code development paradigm of RPC and CORBA applications"; Computer Communications; Elsevier Science Publishers; Amsterdam; vol. 21, No. 3; Mar. 25, 1998; pp. 267-278.

* cited by examiner

*Primary Examiner* — Andy Ho
*Assistant Examiner* — Abdou Seye
(74) *Attorney, Agent, or Firm* — Meyertons Hood Kivlin Kowert & Goetzel, P.C.; Jeffrey C. Hood; Joel L. Stevens

(57) ABSTRACT

Making a service implementation accessible for a client application in a service oriented architecture. The method may include extracting an interface definition language file from the service implementation, which defines the interface information to be provided by the client application to access the service implementation during runtime. The method may further include extracting a server-side mapping file from the service implementation, which defines how the interface information provided by the client application is mapped when accessing the service implementation during runtime.

21 Claims, 4 Drawing Sheets

CALLING SERVICES FROM A REMOTE CLIENT

PRIORITY CLAIM

Figure 1:
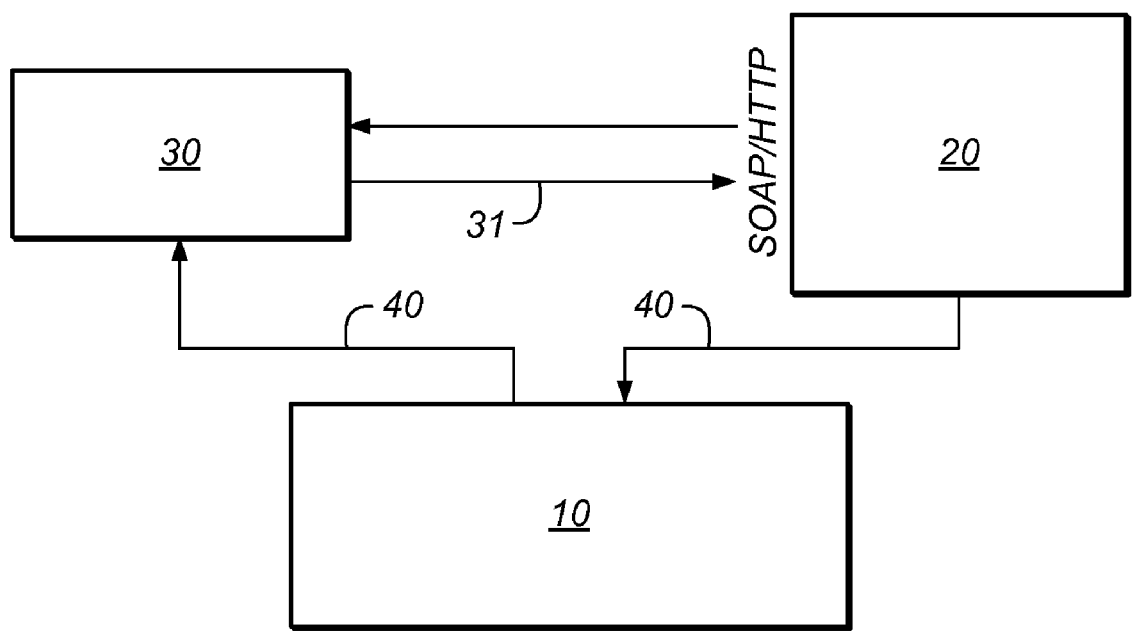

This application claims benefit of priority of European application no. 08002172.8 titled "Method and System for Calling Services from a Remote Client", filed Feb. 6, 2008, and whose inventors are Dr. Rolf Bahlke and Bernhard Fricke.

INCORPORATED BY REFERENCE

European application no. 08002172.8 titled "Method and System for Calling Services from a Remote Client", filed Feb. 6, 2008, and whose inventors are Dr. Rolf Bahlke and Bernhard Fricke, is hereby incorporated by reference in its entirety as though fully and completely set forth herein.

TECHNICAL FIELD

The present invention relates to a method and a system for making accessible and executing services from a remote client in a service oriented architecture (SOA).

DESCRIPTION OF THE RELATED ART

In modern application environments comprising client-server-architectures, it is important to flexibly enable participants to call and use services provided by a server.

Such an environment can be, for example, an SOA, in which resources are made available to participants in the network as independent services that the participants can access in a standardized way. Whereas most definitions of a SOA use SOAP requests conveyed via HTTP/HTTPS over TCP/IP, an SOA may use any web service-based technology. The web services interoperate based on formal definitions which are independent from the underlying platform and programming language. The interface definition encapsulates the specific implementations. An SOA is independent of a specific development technology (such as Java and .NET). The software components become very reusable because the interface is standards-compliant and is independent from the underlying implementation of the web service logic. For example, a C# (C Sharp) service could be used by a JAVA application and vice versa.

Consequently, client applications are, in most cases, implemented in another programming language than the provided services. Besides the plurality of programming languages used in general, the continuing usage of old programming languages is a further challenge. For example, many mainframe applications written in 3GL (third generation languages) programming languages like COBOL or PL/I are still used today for many mission critical applications. None the less, the encapsulated logic should be made callable from a distributed client application. Typical candidates for such a client-side access of a 3GL program are technologies like web-access or web service enablement.

A common approach in the prior art for solving this problem is to process the source code of the 3GL program and to determine the call interface of the program. This call interface comprises a list of parameters and their corresponding data types and thus can be used to generate the necessary language bindings for the client-side programming language or methodology. In order to provide a description of this call interface which can be used independently of the client application's programming language, it is common practice to describe the call interface by a language neutral interface definition language (IDL) file. This IDL file can then be used to generate the client-side language bindings, e.g., for Java, C# or SOAP. Since the IDL file defines the contract or interface between the client and the server application, it must exactly match the parameter definitions of the server 3GL application. In other words, the IDL file may contain the exact definitions of both the calling client application and the called 3GL program.

Consequently, the definitions in the IDL file may use data types which need to be mapped to data types in both 3GL and modern programming languages (e.g. Java, C#, SOAP/WSDL). However, especially if the provided service is implemented in older programming languages such as COBOL, a meaningful one-to-one mapping for all data types in the IDL file may not always exist. Further, some language elements of the older programming language do not exist in the other implementation language which may lead to the introduction of unnecessary and undesired parameters or extensions to the IDL file syntax which are irrelevant for the client-side language bindings. Accordingly, improvements in integration of legacy services or programs in an SOA are desirable.

SUMMARY OF THE INVENTION

Various embodiments are presented of a method for making a service implementation accessible for a client application in a service oriented architecture (SOA).

The method may include extracting an interface definition language (IDL) file from the service implementation, which defines the interface information to be provided by the client application to access the service implementation during runtime. The method may further include extracting a server-side mapping file from the service implementation, which defines how the interface information provided by the client application is mapped when accessing the service implementation during runtime.

Accordingly, the method of the present invention may provide two files describing the interface of a service implementation. The IDL file may be primarily used to describe the client-side by describing the interface information required from the client in order to enable the client to make a call for the service implementation. The information specific to the service implementation, e.g., the information for mapping language specific parts of the service implementation to the IDL description, may be comprised in the second file, the server-side mapping file (SVM). Thus, the client application may only need to provide the generic information necessary for calling the service implementation, e.g., the interface information. Unnecessary parameters or extensions to the IDL file syntax, which are irrelevant for the client but required by the specific service implementation, may be avoided or kept out of the IDL file, thereby simplifying the creation of language bindings for the clients. Both files are provided at development time, e.g., sometime before the actual execution of the service implementation.

In one embodiment, the interface information provided by the client application may be mapped to a format required by the service implementation by mapping the parameter and data-type information comprised in the IDL file to the parameters and data-types expected by the service implementation. Thus, the language specific aspects of the service implementation can be kept separate from the IDL file. This is advantageous, for example, in the following case: older programming languages such as 3GL languages may contain data-types which can not be mapped directly to data-types known to IDL or modern languages such as, for example, Java, C# or SOAP. In these cases, it may be necessary to examine the usage of the data type and to create different IDL structures depending on the determined usage type in order to simplify the client-side language bindings. In the prior art this is not possible, since the IDL file must exactly match the definitions of the service implementation. By contrast, embodiments described herein may result in an IDL file which may not exactly match to the service implementation. Further, the older languages may comprise pseudo-parameters, as e.g. "FILLER" in COBOL, which have no semantic meaning. In the prior art, these parameters have to be contained in the IDL file and the client has to provide parameter values, although the parameters are completely irrelevant to the client. Providing a SVM file comprising a mapping which is adapted to the specifics of the implementation of the service, e.g., language specifics, solves the above outlined problems and provides more flexibility and simplified IDL files.

In a further embodiment, the service implementation may be implemented in a 3GL programming language, e.g., in the programming language COBOL. The language COBOL has existed since the beginnings of computer development and is still widely used. One reason for this continued use is that it is difficult and expensive for enterprises to replace all of the legacy COBOL programs. Instead of trying to replace existing programs by investing lots of time and effort, it is more efficient to make the old programs accessible to new architectures such as an SOA, especially since they are already tested and proven to work.

In another embodiment, a remote procedure call (RPC) server may have access to the server-side mapping file in order to call a service implementation, located on the same or a different server, using the SVM file during runtime. The SVM file may be stored locally, e.g., in the same location as the RPC server, in order to reduce access time and to avoid bandwidth consumption in a network. However, it is also possible to store the SVM file in a repository or in any other location which is not local. In these cases, the RPC server needs to have access to the SVM file, e.g., by using network connections or the like.

By using a separate RPC server having access to the SVM file related to the particular service, the working load of the implementation server executing the service implementation may be reduced, since the mapping of the incoming remote call is already performed on the RPC server. Further, by using a separate server having access to an SVM file, the service implementation may not need to have any knowledge of the SVM file. Thus the service implementation can be a legacy implementation, which may remain unchanged, e.g., as implemented years ago by its developer. Consequently, it can be called by the RPC server in the same manner as other applications might have called the service implementation up to now. In some embodiments, the RPC server may run on a different computer than the service implementation and on a different computer than the client-side language binding. However, it is also possibly that the RPC server may run on the same computer as on which the client-side language binding and the service implementation are executed. Further, any other combination such as e.g. RPC server and client-side language binding running on the same computer or the like, are possible.

The server-side mapping file may be made accessible for the remote procedure call server by a deployment wizard, which may support the developer in deploying the server mapping to the RPC server or any other location and thus simplify this procedure for a developer. The RPC server may work together with the deployment wizard to receive the server mappings. Further, the deployment wizard may be integrated in a workbench.

Alternatively, the server-side mapping file may be made accessible for the remote procedure call server using the file transfer protocol (FTP) and/or the IBM utility IDCAMS, an "Access Method Service". This alternative may provide the developer with the possibility to manually deploy the mapping file to the server or RPC server. However, it should be noted that the invention is not limited to these two embodiments for making the server-side mapping file accessible to a server.

In a further embodiment, an extractor wizard may be used for extracting the necessary information for generating the interface definition language file and/or the server-side mapping file. Alternatively, separate and different extractor wizards can be used for the IDL file and the SVM file, which may be adapted to the special requirements for extracting the information for these files. The extractor wizard may simplify and may at least partly automate the extraction process supporting the developer who thus does not have to manually execute the whole process.

The generation of the interface definition language file and/or the server-side mapping file may include presenting a mapping editor to a user. The mapping editor can be used for editing the output of the extractor wizard in order to precisely model the output to the two files. Alternatively, an individual mapping editor can be provided for each of the two files. The mapping editor may provide various supporting features, such as, for example, an editor, a property view and/or a problem list.

Additionally, or alternatively, the method may include receiving a remote call with interface information from the client application, wherein the remote call is in accordance with an interface definition language file for the service implementation. The method may further include mapping the interface information provided in the remote call according to the mapping described in a server-side mapping file. The method may include executing a service implementation using the mapped interface information.

In some embodiments, the method may be adapted to use the IDL file and the SVM file provided by the above described methods during runtime, e.g., after a client application has called a service implementation. The call can be made for testing the operation of the SOA, for real deployment or any other purpose. Advantageously, the client application may only need to provide the generic call information, since the received interface information may then be automatically mapped using the SVM file in order to finally execute the service implementation.

In one embodiment, the remote call may be received by a remote procedure call server which may then call the service implementation for execution after mapping the interface information according to the server-side mapping file.

In some embodiments, the above-described methods may be implemented using a system which includes a first extractor unit extracting an interface definition language file from the service implementation, which defines the interface information to be provided by the client application to access the service implementation during runtime. The system may further include a second extractor unit extracting a server-side mapping file from the service implementation, which defines how the interface information provided by the client application is mapped when accessing the service implementation during runtime.

SHORT DESCRIPTION OF THE DRAWINGS

Figure 2:
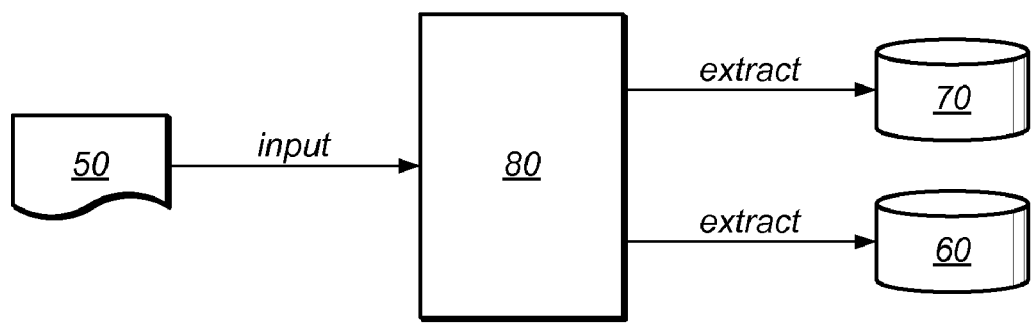
Figure 3:
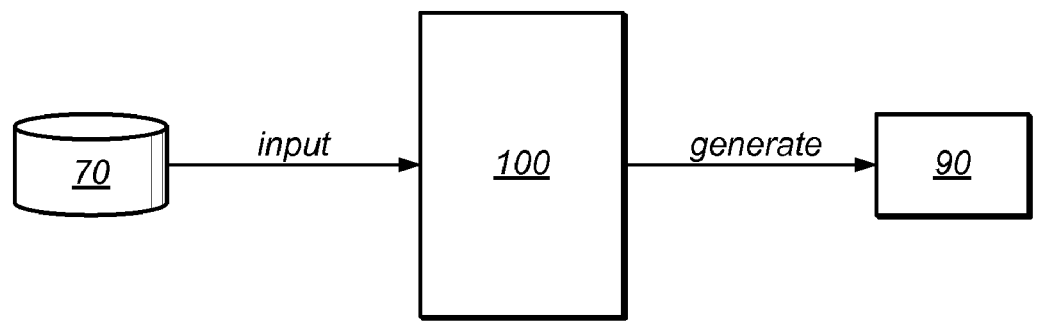
Figure 4:
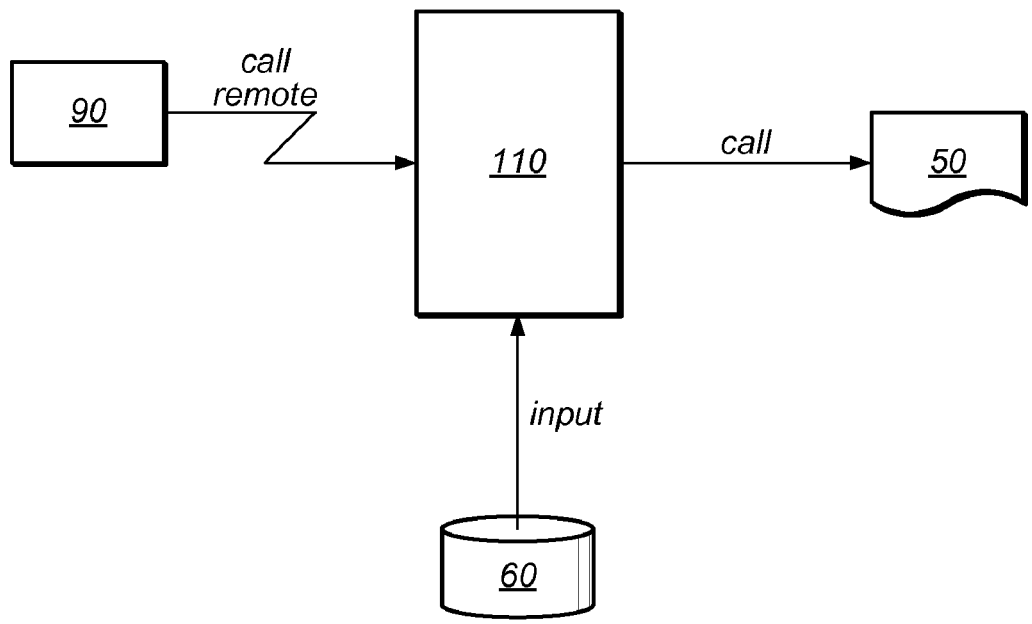
Figure 5:
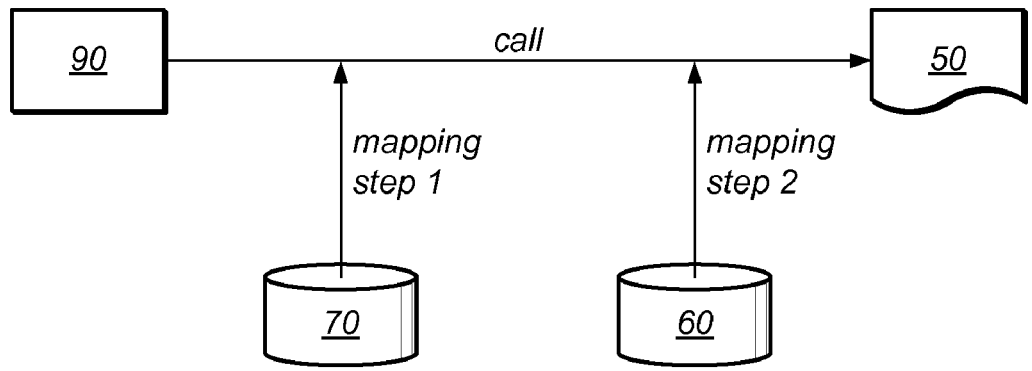
Figure 6:
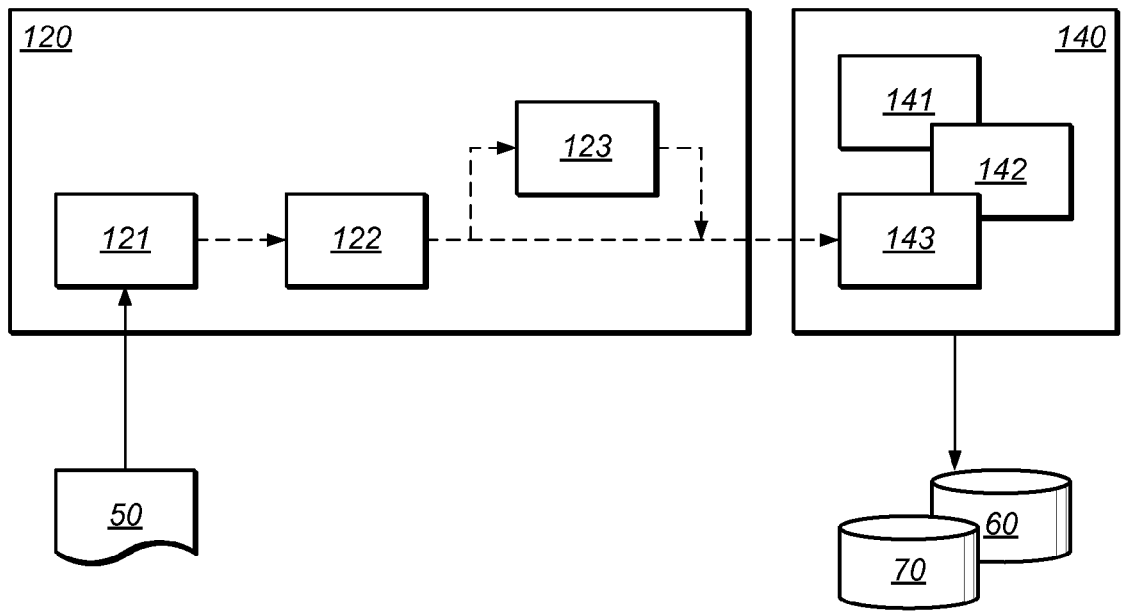
Figure 7:
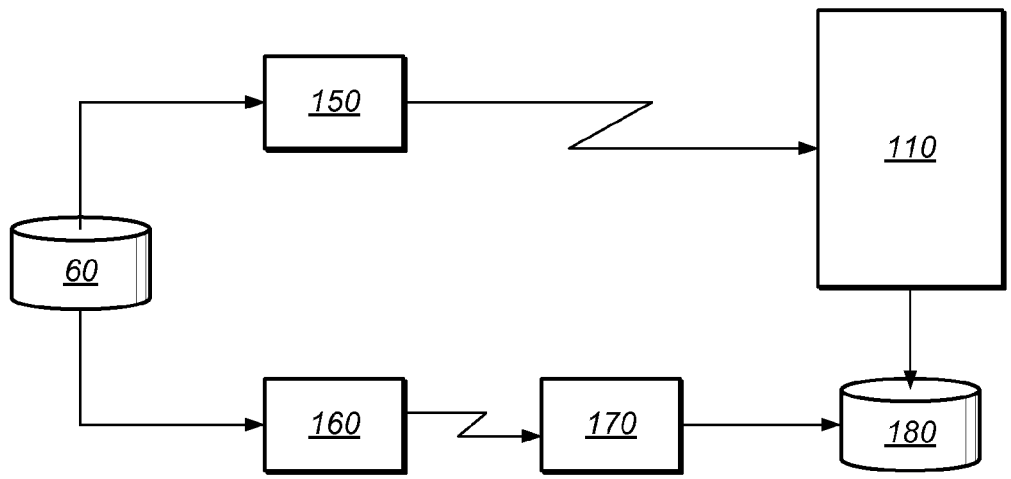

In the following detailed description presently preferred embodiments of the invention are further described with reference to the following figures:

FIG. 1: A general overview of an example of an extremely simplified SOA comprising an application calling a Web Service and a registry with a description of the Web Service, according to one embodiment;

FIG. 2: An exemplary extraction process of an IDL and a SVM file, according to one embodiment;

FIG. 3: An example for the process of generating a language binding for an IDL file, according to one embodiment;

FIG. 4: An exemplary processing of a remote call for a service implementation, according to one embodiment;

FIG. 5: An example of the performed mapping steps, according to one embodiment;

FIG. 6: A more detailed illustration of an exemplary extraction process for IDL and SVM files, according to one embodiment; and FIG. 7: Two exemplary alternatives to make the SVM file accessible to a server, according to one embodiment.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Various embodiments are presented of a method for making a service implementation accessible for a client application in a service oriented architecture (SOA).

Various embodiments are described with reference to making services implemented in COBOL accessible to a remote client in a SOA. However, it is to be understood, that the invention is not restricted to COBOL implementations. On the contrary, the concepts presented herein can be applied to service implementations using any kind of programming language. For example, a service implementation might be a web service implemented using any kind of programming language, a program or application or any kind of software, which should be called by a remote client. Further, a client might be a client application, another web service or any other kind of program or software intending to call the service implementation.

Furthermore, while various embodiments are described in the following in the context of an SOA, the underlying concept is more generally applicable in other situations, wherein a program is to be made available to a client using a different programming language than the implementation of the program.

FIG. 1

FIG. 1 presents an overview of an extremely simplified SOA, in which web services could be made accessible and executed according to the method described below:

As shown, an application 30 or client 30 may issue a request 31 for a web service 20. To this end, the application 30 or client 30 may need at first a description about the interface definitions of the web service 20. This description 40, which may, for example, be provided in the Web Service Definition Language (WSDL), can either be obtained directly from the web service 20 or from a registry/repository 10 (cf. FIG. 1). It is apparent that a SOA can comprise more than one application/client and more than one web service as well as any other type of component.

The registry/repository 10 may include descriptions of all web services of the SOA, for example WSDL files 40 with information about the function, the data, the data type and the exchange protocols of the respective web service. Therefore, if the application 30 or client 30 intends to send a request to the web service 20, it can obtain the WSDL file 40 from the registry 10 to find out how to access the web service 20. However, it is to be understood that the present invention is not limited to the simplified SOA of FIG. 1 but can be used with any kind of SOA.

If a remote client wants to call a service implementation, an IDL file may be required which contains definitions matching, e.g., exactly, the definitions of both the client applications and the called service implementation. Thereby, the definitions of the service implementation may include a list of parameters and the related parameter types. In case of an SOA, the IDL file can be a part of the WSDL description of the requested service. However, the requirement of exact matching definitions is problematic for a range of programming languages, especially for 3GL languages which contain elements that cannot be mapped in a simple manner to the IDL file. In particular, there are the following two main issues arising if the service implementation is in COBOL. Similar problems can also occur in other programming languages.

First, data types in COBOL include rather low-level types like "REDEFINE" which is based on a redefinition of a particular storage layout. This is an example for a data type which cannot be mapped directly to an IDL data type, because modern languages abstract from the underlying storage layout and thus do not allow such a construct. In this case, the usage of "REDEFINE" may need to be examined, possibly by means of manual interaction of the user of a GUI application. Depending on the usage type, different IDL structures might be necessary. As a result, the definitions in the IDL file would no longer match the definitions in the service implementation.

Second, in COBOL programs, subprogram parameter lists typically contain pseudo-parameters like "FILLER" which have no semantic meaning. If these parameters are present in the IDL file, they will also appear in the client-side language bindings generated from this IDL file. However, these parameters may be completely meaningless for the client applications which will call the service implementation. Consequently, these parameters may not appear at all in the client-side interface.

In order to still be able to include such service implementations in an SOA and to make them callable by remote client applications, the following exemplary process uses an IDL file and a SVM file for the service implementation.

The complete process for calling a service implementation from a remote client using an SVM file may include three phases or steps, wherein the first two steps may be preformed during development time and the third step may be performed during runtime. In the following, the method steps that may be performed during development time, e.g., the first two phases, are described.

FIG. 2

First, FIG. 2 illustrates an example for the extraction phase, during which the IDL file 70 and the SVM file 60 may be extracted from the service implementation 50, e.g. a 3GL program, by means of an extractor 80. The extractor 80 may be provided as an extractor tool. The extractor 80 may use the service implementation 50 as input and analyze its contents according to FIG. 6, which will be described later. The analysis may result in the extraction of the IDL file 70 which may include the modelled interface of the service implementation and the SVM file 60 comprising service implementation specific information. It is to be noted that there may be more than the single extractor 80 of FIG. 2. If so, each extractor can be specialized for extracting information required for a particular file, e.g. the IDL file or the one or more SVM files for service implementations in different programming languages. It is further noted that the extraction of both files might happen simultaneously or sequentially.

The second phase is a build phase, during which at least one client-side language binding object 90 may be generated as shown in FIG. 3 using the IDL file 70 extracted in the first phase. The IDL file 70 containing the language-neutral client-side interface may be input in a generator 100, possibly a generator tool. The generator 100 may adapt the language-neutral interface description to the implementation language and the particular implementation used by the client or client application, so that the client may understand the interface. At runtime, it can then provide the necessary information such as required variable values to the language binding object 90 for calling the service implementation (not shown in FIG. 3).

An exemplary embodiment of the third phase is shown in FIG. 4. At runtime, i.e., during execution, a client may initiate a remote call for a service implementation 50 using its client-side language binding 90. A server 110, e.g., a remote procedure call (RPC) server, may receive the client's remote call. In order to call the service implementation correctly, the server 110 may require during runtime the SVM file 60. Therefore, it may access and use the SVM file 60 extracted in the first phase and containing the additions necessary to complete the IDL file according to the specific requirements of the service implementation 50, e.g., by using runtime modules which are added to the RPC server 110. The runtime modules further enable the RPC server 110 to merge the interface information corresponding to the IDL file and the SVM file information. By combining the interface information comprised in the remote call with the information comprised in the SVM file 60, the server 110 may be enabled to correctly call the service program 50. Other embodiments of the invention might involve more than one server between the client-side language binding 90 and the service implementation 50, performing several different mapping steps. Alternatively, the RPC server 110 can run on the same computer as the client-side language binding 90 or it can be on a separate remote computer or on the same computer as the service implementation 50. Further, it is possible, that the client-side language binding 90, the RPC server 110 and the service implementation 50 are all located on the same computer. In some embodiments, the service implementation 50 may not have access to the SVM file and may not interpret it. However, in one embodiment there might be no RPC server and the remote call may be directly sent to the service implementation 50, which then needs to have access to the SVM file 60 first.

An advantage offered by an embodiment of the described 3-phase-solution is the 2-step mapping of the client information to the information of the service implementation illustrated in FIG. 5. After the client has called the service implementation 50 but before the service implementation 50 receives the call, two mapping steps may be performed. The first mapping step may include the mapping of the information given by the client-side language binding 90 to the information comprised in the IDL file 70. This step is a language neutral step with regard to the programming language of the service implementation 50. The second mapping step may map the previously mapped information in accordance with the information provided in the SVM file 60. This step may be language specific, since it adapts the language neutral information in the IDL file 70 to the language specific format required by the service implementation 50. In other words, the SVM file 60 may complete the IDL file 70 with a mapping from the programming-language-neutral parameter definitions in the IDL file 70 to the parameters and data types expected by the service implementation. Both mapping steps may not be limited to a one-to-one mapping between the parameters and data-types before and after the mapping. In some embodiments, runtime modules may be added to the RPC server 110 which implement this language specific mapping step 2 in FIG. 5 by using the information provided in the SVM file 60 to enable the server 110 to correctly access the service implementation 50.

By providing two mappings it may no longer be necessary to exactly map the parameter structure of the service implementation to the IDL file. In contrast to the prior art, it is no longer necessary that the IDL file describes both the client interface and the server interface. Instead, the IDL file may be targeted to describe primarily the client-side, since it is the starting point for the generation of one or even more client-side language bindings (cf. FIG. 3). Consequently, the IDL file no longer precisely describes the server side, so that for a correct call of the service implementation additional information may be required. The required information may, in one embodiment, be a mapping from the parameter and data type information contained in the IDL file to the parameter and data-types expected by the service implementation. This mapping information may be provided in the SVM file. Therefore, it may include at least some of the following: special programming language constructs such as "REDEFINE", "FILLER" pseudo-parameters, constants, operation bindings to the service implementation and/or other suitable information.

This 2-step mapping may lead to the following advantages. The IDL file may be kept free of syntax whose sole purpose may be to reflect a particular storage layout of the target service implementation, which may be unknown in modern programming languages. Further special programming language constructs such as "REDEFINE", pseudo-parameters (e.g. "FILLER") or others contained in the applied programming language (3GL, COBOL or others) may not have any impact on the client-side language binding, because they may be included in the SVM file.

The above mentioned extraction process (FIG. 2) of the IDL file 70 and the SVM file 60 will be described in more detail with respect to FIG. 6. The extractor 80 (FIG. 2) may include an extractor wizard 120 and a mapping editor 140. None of these components are mandatory. Further, it is possible to provide them in a separate or combined manner. The extractor 80, in particular the extractor wizard 120, may be adapted to extract information of implementations of a specific language, e.g. COBOL. The extractor wizard 120 may serve for inspecting the source code and its copybooks in order to identify data items, e.g., COBOL data items, and their related settings 121. Based thereon, the extractor wizard 120 may be able to extract the input parameters 122 required by the service implementation and the output parameters 123 provided by the service, thus providing an interface to the service implementation. In some embodiments, the extractor wizard 120 may provide this interface as a suggestion to the developer, who then checks its correctness and performs further adaptations, if necessary.

Further, various features offered by the mapping editor 140 may support the developer in modelling the information extracted by the extractor wizard 120 to a client interface, e.g., the IDL file and/or to a server-side interface, e.g., the SVM file. Such features might be one or more of the following: the suppression of unwanted parameters of the service implementation in the IDL file, the definition of constants for parameters of the service implementation, the definition of "REDEFINE" storage layouts for the IDL file and/or the identification of multiple interfaces of a single service implementation, among others. However, the features of the mapping editor 140 are not limited by the previously mentioned features. In particular, the feature of defining constants simplifies the IDL file and thus reduces the client-side effort for calling the service implementation, since the defined constants do not appear in the IDL file 70 but in the SVM file 60. Consequently, they can be passed from the RPC server 110 to the service implementation 50 during runtime. The other mentioned feature of identifying multiple interfaces may relate to different operations provided by the service implementation, e.g. such as read, add, modify and/or delete a single entity, e.g., any object, possibly a data object processed by the service implementation. In one embodiment, these interfaces may be first mapped to so called IDL programs and in a next step to corresponding (web) service operations.

The whole extraction and/or modelling process may be fully automated. It is also possible to extract and model the retrieved information to both interface descriptions of the service implementation in a completely user-driven process or in a partially user-driven process supported by the extractor wizard 120 and/or the mapping editor 140, possibly both providing suggestions for an interface and a mapping which are then checked and corrected by the developer. The mapping editor 140 may include further supporting means, e.g., a property view 142 and a problem list 143, both possibly connected to an editor 141 for mapping the service implementation to both interface descriptions. The problem list 143 may be a result of the information extracted by the extractor wizard 120.

The SVM file created by the described extraction process is, in one embodiment, required by the server 110, e.g., an RPC server, for performing a correct mapping from the language-neutral parameter definition in the IDL file to the requirements of the service implementation. Therefore, the SVM file may need to be accessible to the server. This can be realized by deploying the SVM file 60 to the server 110 according to the two alternatives shown in FIG. 7. One possibility is to use a deployment wizard 150 which possibly is integrated in a workbench as a means for supporting the deployment of the SVM file 60 to the server 110. In one embodiment, the server 110 may work together with the deployment wizard 150 to receive the SMV file 60. The RPC server 110 then may store the SVM file in any kind of physical storage 180. Alternatively, the SVM file 60 can be deployed manually using FTP 160 and the IBM utility IDCAMS 170. As a result, the SVM file 60 can be stored directly in a storage structure 180 which may be accessed by the RPC server 110. However, the invention is not limited to these two embodiments for deploying the mapping information to the server 110.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A method for making a service implementation accessible for a client application in a service oriented architecture, the method comprising:
    utilizing a computer to perform:
        extracting and storing an interface definition language (IDL) file from the service implementation, wherein the service implementation is a pre-existing server program in the service oriented architecture, wherein the IDL file defines interface information to be provided by the client application to access the service implementation during runtime; and
        extracting and storing a server-side mapping file from the service implementation, wherein the server-side mapping file defines how the interface information provided by the client application is mapped when accessing the service implementation during runtime;
        wherein the IDL file and the server-side mapping file are used to perform client communication with the service implementation without requiring changes to the pre-existing server program; and
        wherein said extracting the IDL file and/or extracting the server-side mapping file from the service implementation comprises using an extractor wizard for extracting necessary information for generating the interface definition language file and/or the server-side mapping file, wherein said using the extractor wizard comprises presenting a mapping editor to a user.

2. The method of claim 1, wherein the interface information provided by the client application is mapped to a format required by the service implementation.

3. The method of claim 2, wherein the server-side mapping file comprises a mapping from parameter and data-type information comprised in the interface definition language file to the parameters and data-types expected by the service implementation.

4. The method of claim 1, wherein the service implementation is implemented in a 3GL programming language.

5. The method of claim 1, wherein the service implementation is implemented in the programming language COBOL.

6. The method of claim 1, wherein a remote procedure call server has access to the server-side mapping file in order to call the service implementation using the server-side mapping file during runtime.

7. The method of claim 6, wherein the server-side mapping file is accessible for the remote procedure call server by a deployment wizard.

8. The method of claim 6, wherein the server-side mapping file is accessible for the remote procedure call server using FTP and a IDCAMS utility.

9. The method of claim 1, further comprising:
    receiving a remote call with interface information from the client application, wherein the remote call is in accordance with an interface definition language file for the service implementation;
    mapping the interface information provided in the remote call according to the mapping described in a server-side mapping file; and
    executing a service implementation using the mapped interface information.

10. The method of claim 9, wherein said receiving is performed by a remote procedure call server and wherein the method further comprises:
    the remote procedure call server calling the service implementation for execution after mapping the interface information according to the server-side mapping file.

11. The method of claim 1,
    wherein the interface definition language file and the server-side mapping file are useable to enable the client application created in a first programming language to interface to the server implementation created in a second programming language.

12. A non-transitory computer-accessible memory medium comprising program instructions for making a service implementation accessible for a client application in a service oriented architecture, wherein the program instructions are executable to:

extract an interface definition language file from the service implementation, wherein the service implementation is a pre-existing server program in the service oriented architecture, wherein the IDL file defines interface information to be provided by the client application to access the service implementation during runtime; and extract a server-side mapping file from the service implementation, wherein the server-side mapping file defines how the interface information provided by the client application is mapped when accessing the service implementation during runtime;

wherein the interface definition language file and the server-side mapping file are useable to enable the client application created in a first programming language to interface to the server implementation created in a second programming language without requiring changes to the pre-existing server program; and wherein said extracting the IDL file and/or extracting the server-side mapping file from the service implementation comprises using an extractor wizard for extracting necessary information for generating the interface definition language file and/or the server-side mapping file, wherein said using the extractor wizard comprises presenting a mapping editor to a user.

13. The non-transitory memory medium of claim 12, wherein the interface information provided by the client application is mapped to a format required by the service implementation.

14. The non-transitory memory medium of claim 13, wherein the server-side mapping file comprises a mapping from parameter and data-type information comprised in the interface definition language file to the parameters and data-types expected by the service implementation.

15. The non-transitory memory medium of claim 12, wherein the service implementation is implemented in a 3GL programming language.

16. The non-transitory memory medium of claim 12, wherein the service implementation is implemented in the programming language COBOL.

17. The non-transitory memory medium of claim 12, wherein a remote procedure call server has access to the server-side mapping file in order to call the service implementation using the server-side mapping file during runtime.

18. The non-transitory memory medium of claim 12, wherein the program instructions are further executable to:

receive a remote call with interface information from the client application, wherein the remote call is in accordance with an interface definition language file for the service implementation;

map the interface information provided in the remote call according to the mapping described in a server-side mapping file; and execute a service implementation using the mapped interface information.

19. A system for making a service implementation accessible for a client application in a service oriented architecture, the system comprising:

a processor;

a memory medium coupled to the processor, wherein the memory medium stores:

a. a first extractor unit extracting an interface definition language file from the service implementation, wherein the service implementation is a pre-existing server program in the service oriented architecture, wherein the IDL file defines interface information to be provided by the client application to access the service implementation during runtime;

b. a second extractor unit extracting a server-side mapping file from the service implementation, wherein the server-side mapping file defines how the interface information provided by the client application is mapped when accessing the service implementation during runtime;

wherein the IDL file and the server-side mapping file are used to perform client communication with the service implementation without requiring changes to the pre-existing server program; and wherein the first and/or the second extractor unit further comprises an extractor wizard for extracting necessary information for generating the interface definition language file and/or the server-side mapping file, wherein the extractor wizard comprises a mapping editor adapted to be presented to a user during the generation of the interface definition language file and/or the server-side mapping file.

20. The system according to claim 19, wherein the first and/or the second extractor unit are configured to analyse source code of the service implementation and determining settings and/or input and output parameters.

21. The system according to claim 19, further comprising a remote procedure call server adapted to access the server-side mapping file in order to call the service implementation using the server-side mapping file during runtime.

* * * * *